United States Patent [19]
Kidd et al.

[11] Patent Number: 5,667,389
[45] Date of Patent: Sep. 16, 1997

[54] AUTOMOTIVE VEHICLE MODULAR BUSS

[75] Inventors: Richard Louis Kidd, Stow; Daniel Griffith Mathey, Warren; Paul Di Liello, Cortland; David Glen Siegfried, Vienna, all of Ohio; Robert William Rimko, Transfer, Pa.; Anthony Joseph Corso, Struthers, Ohio

[73] Assignee: General Motors Corporation, Detroit, Mich.

[21] Appl. No.: 543,544

[22] Filed: Oct. 16, 1995

[51] Int. Cl.$^6$ .................................... H01R 9/07
[52] U.S. Cl. .................. 439/75; 439/492; 439/651
[58] Field of Search .................... 439/492, 499, 439/67, 77, 75, 651

[56] References Cited

U.S. PATENT DOCUMENTS

| | | | |
|---|---|---|---|
| 1,848,377 | 3/1932 | Novelli . | |
| 3,292,133 | 12/1966 | Burch et al. | 339/126 |
| 3,706,067 | 12/1972 | Hanson | 339/45 M |
| 4,012,093 | 3/1977 | Crane | 439/77 |
| 4,474,420 | 10/1984 | Nestor | 339/166 MF |
| 4,533,200 | 8/1985 | Wilson | 439/499 |
| 4,848,829 | 7/1989 | Kidd | 296/152 |
| 4,869,670 | 9/1989 | Ueda et al. | 439/34 |
| 4,942,499 | 7/1990 | Shibata et al. | 361/428 |
| 4,943,109 | 7/1990 | Skrbina et al. | 296/146 |
| 4,943,241 | 7/1990 | Watanabe et al. | 439/34 |
| 5,023,752 | 6/1991 | Detter et al. | 361/399 |
| 5,241,454 | 8/1993 | Ameen et al. | 439/75 |
| 5,354,211 | 10/1994 | Svette, Jr. et al. | 439/381 |

FOREIGN PATENT DOCUMENTS

| | | | |
|---|---|---|---|
| 1142160 | 2/1969 | United Kingdom | 439/77 |

OTHER PUBLICATIONS

"Magnesium Integrated Instrument Panel Beam," Research Disclosure #36023, Apr. 1994.

*Primary Examiner*—Gary F. Paumen
*Attorney, Agent, or Firm*—Ernest E. Helms; Cary W. Brooks

[57] ABSTRACT

A modular buss center for an automotive vehicle is provided including a first plug connector; an intermediate terminal having a first male end and a second female end and at least one arm, the first end being electrically connected to the first plug connector; a first template with a hole for receipt of the intermediate terminal; at least one flex circuit, the flex circuit having at least one cut-out flag, the flag making contact with the intermediate terminal arm; a second template separated from the first template by the flex circuit, the second template having a hole for receipt of the intermediate terminal second end; and an electrical component positioned on the second template opposite the flex circuit, the electrical component being electrically connected to the intermediate terminal second end.

12 Claims, 4 Drawing Sheets

5,667,389

AUTOMOTIVE VEHICLE MODULAR BUSS

FIELD OF THE INVENTION

This invention relates to electrical power distribution centers and more particularly to electrical power distribution centers for providing electrical interconnections between electrical and electronic devices and electrical wiring connections in a vehicular electrical system. Often such power distribution centers are referred to as buss centers.

BACKGROUND OF THE INVENTION

The buss center as used today in vehicles and in the past provides a central location of circuit protection for the power and signal distribution system, as well as provides a simple means to connect circuits together (i.e., common ground circuits). Typical components found in a buss center will be fuses (for circuit protection), relays (switching of loads), and circuit breakers and optionally also include harness components such as pluggable diodes for ac, resistors, etc., as well as splice plates to buss circuits together.

SUMMARY OF THE INVENTION

The present invention provides an alternative buss center to that described in Detter et at, U.S. Pat. No. 5,023,752, commonly assigned, and is also particularly applicable to an improved alternative to buss centers previously available.

DESCRIPTION OF THE PREFERRED EMBODIMENT

Referring to FIGS. 1–5, the buss center 7 according to the present invention is shown mounted in a magnesium substructure of a vehicle instrument panel 10. The buss center is electrically connected to various electrical components of the vehicle such as the engine control module, heating ventilation and air conditioning system, and lighting system of the vehicle via a group of cables represented at item 12. Additionally, the buss center 7 is electrically connected to various instrument panel indicators and controls via flexible circuits 16.

Figure 1:
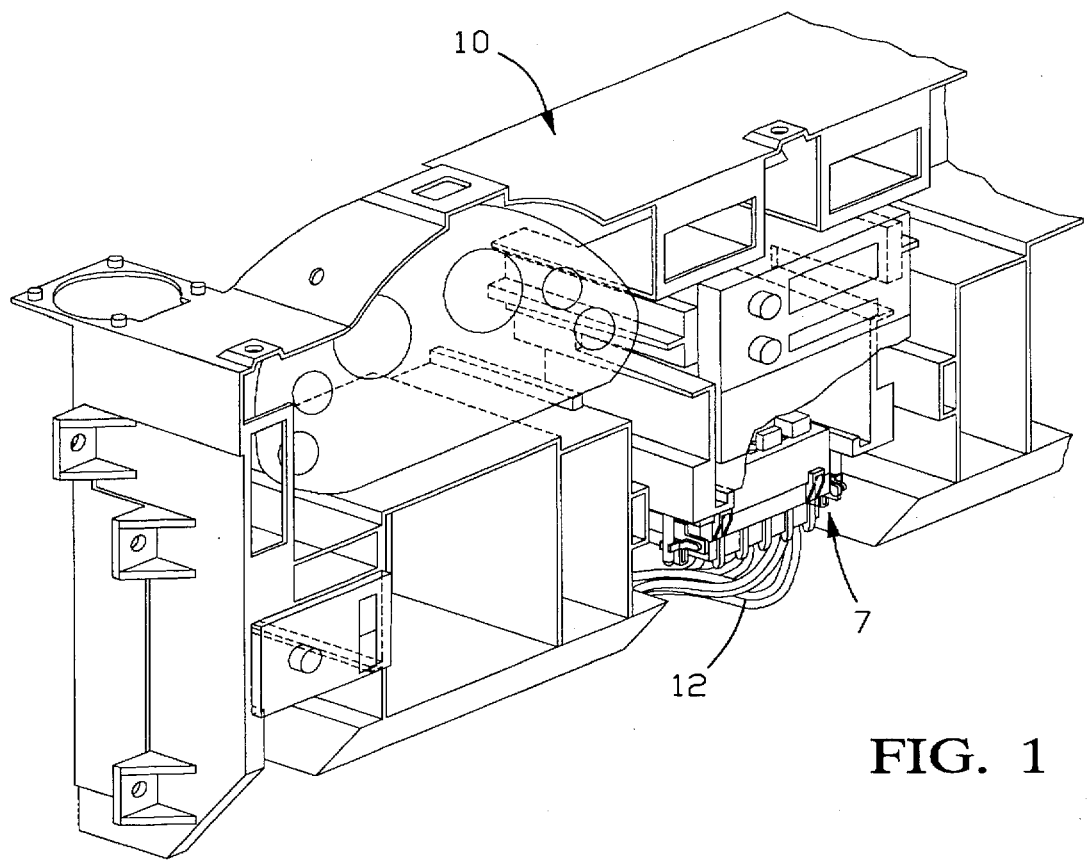
FIG. 1 is a perspective view of a preferred embodiment buss center according the present invention shown in its environment of mounting with the magnesium frame substructure of an automotive vehicle instrument panel.
Figure 2:
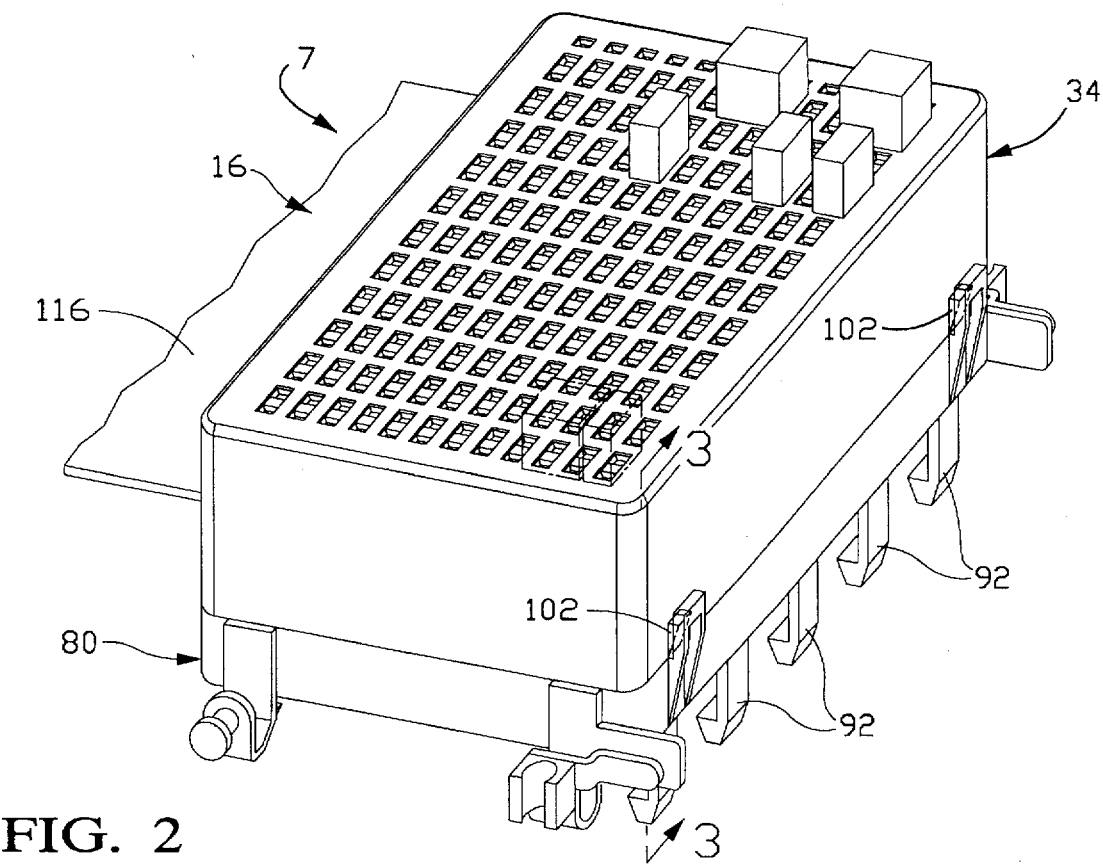
FIG. 2 is an enlarged perspective view of the buss center shown in FIG. 1 illustrating the placement of several fuses and relays and the second template being snapped in place upon a frame.
Figure 3:
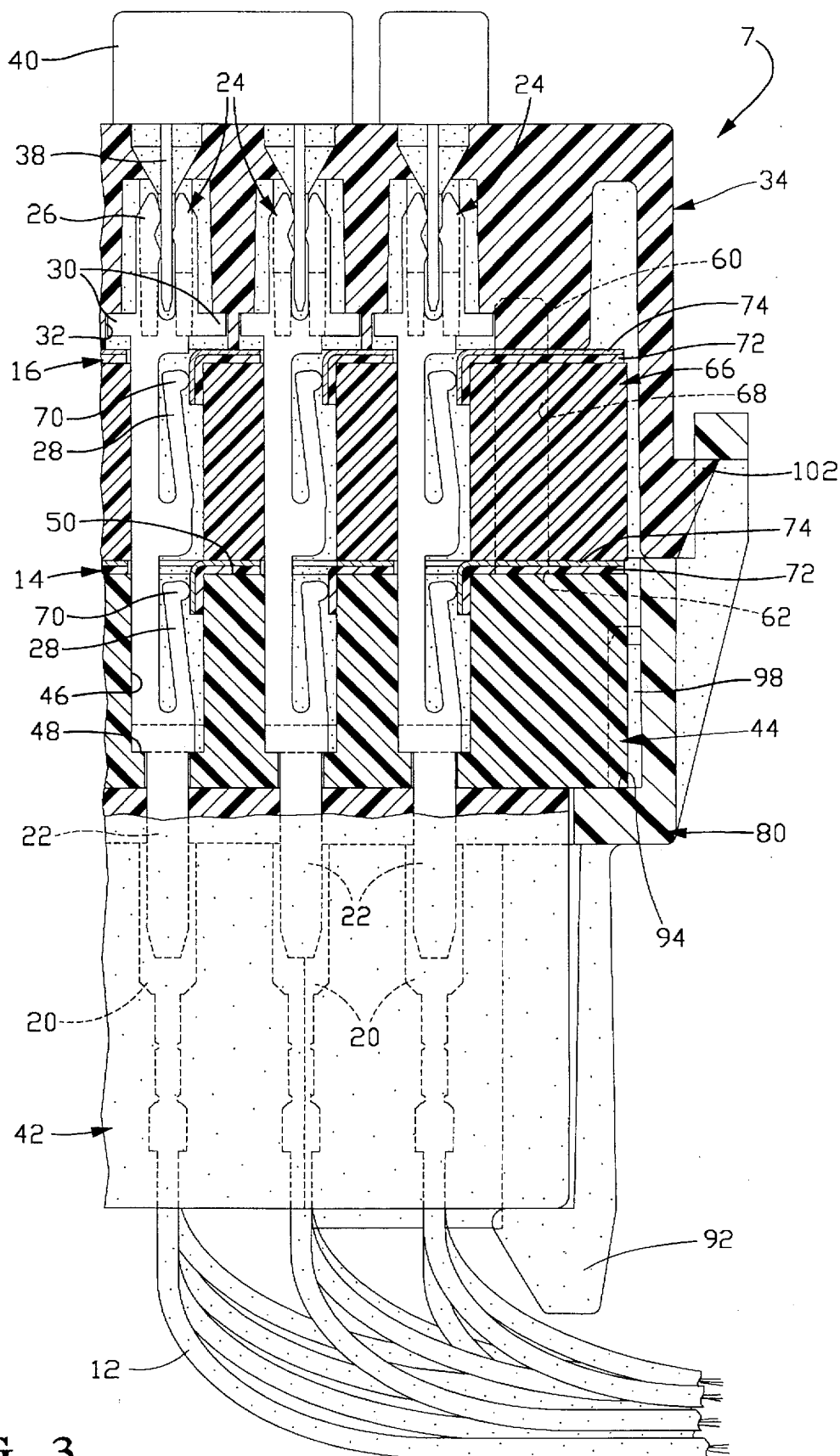
FIG. 3 is an enlarged, partially sectioned buss center as illustrated in FIG. 2.
Figure 4:
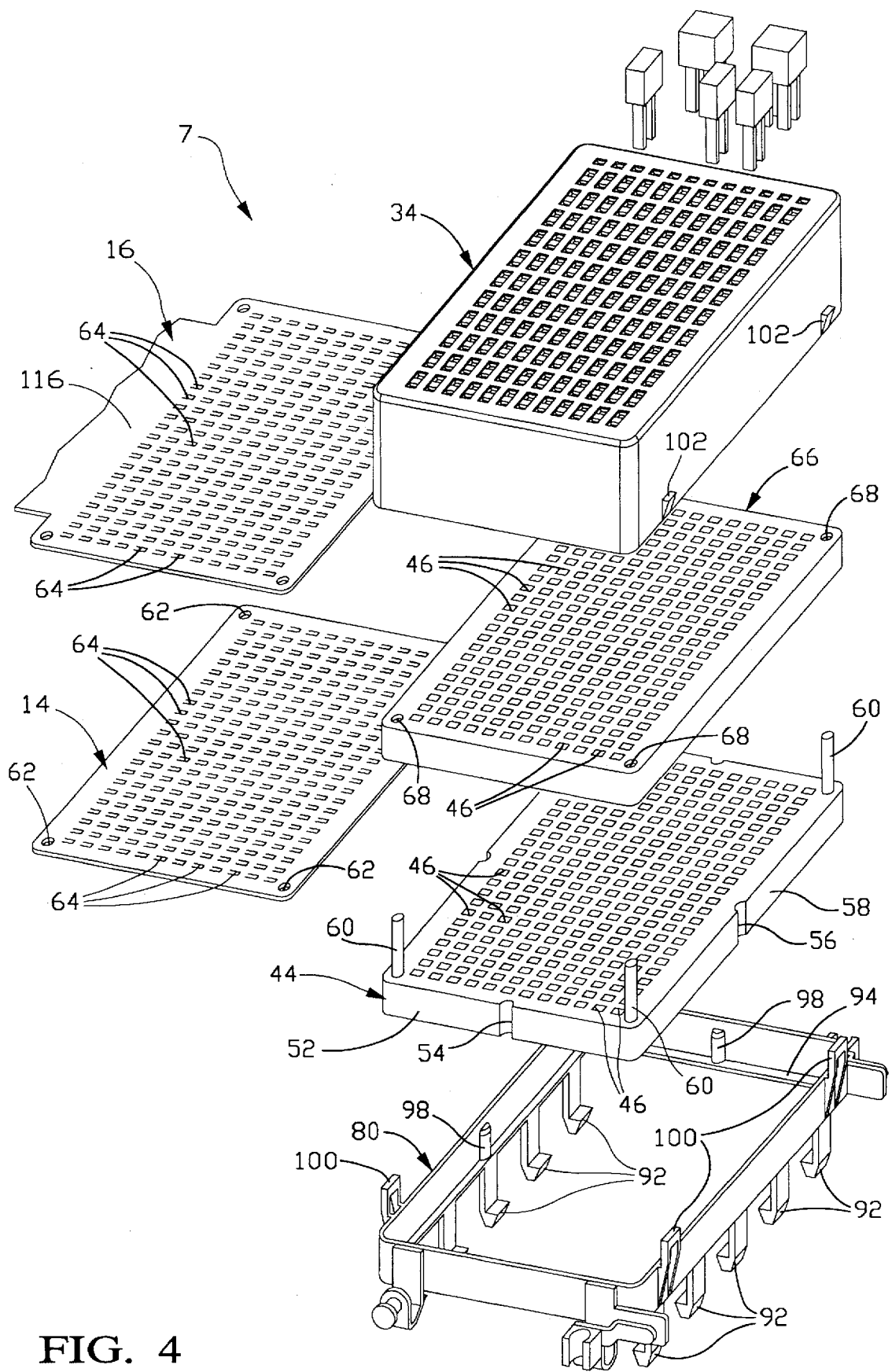
FIG. 4 is an exploded view illustrating the buss center before assembly.

Referring primarily to FIGS. 3 and 4, the buss center has a group of bottom female terminals 20 which are electrically connected to the cables 12. The bottom female terminal 20 is mated with a male first end 22 of an intermediate terminal 24. The intermediate terminal 24 has a female second end 26 and has two spring arms 28, respectively. The intermediate terminal 24 also has two horizontal projections 30 which are positioned within a counter bore 32 of a top template 34.

The female head 26 of the intermediate terminal has three-point contact with a male blade 38 of an electrical component such as a fuse 40. The electrical component may also be a relay, circuit breaker, pluggable diode or ac resistor, as well as other similar electrical components. The intermediate conductor 24 is typically made from copper or any other suitable conductive material.

Placed on top of a body 42 holding female plug terminals 20 is a plastic or other suitable nonconductive material template 44. The template 44 has a series of holes 46 for receipt of the intermediate terminals 24 and a shoulder region 48 which limit the vertical position of the intermediate terminal 24. Additionally, the template 44 has a top surface 50, a side edge 52 and a side groove 54. Also, there is a side groove 56 in the first template longitudinal face 58. The template 44 also has at its four rectangular corners vertically projecting studs or alignment pins 60.

Placed on top of the template 44 is a flex circuit 14. The flex circuit 14 has holes 62 to allow it to be aligned on pins 60. Also, the first flex circuit 14 has strategically placed, as determined by the circuit diagram, a series of flags 64. Mounted between the second top template 34 and the first template 44 is a template 66. In like manner, the template 66 may be essentially identical with the template 44 with the exception of the elimination of the side grooves. The template 66 will also have a series of openings 46, allowing for passage of the intermediate terminals 24.

The second flex circuit 16, which is the instrument panel circuitry, is placed on top of the template 66. The template 66 is held in position on the template 44 by virtue of a hole 68 provided for receipt of the alignment pin 60.

The flags 64, if so desired, protrude within the openings 46 of the template, whereupon they make electrical contact with a head 70 of the arms 28. Terminal bussing between the flexible circuits 14 and 16 can occur as well as between circuits contained on either flexible circuit 14 or 16, depending upon vehicle electrical requirements for bussing, switching or fusing or other current or voltage modification.

Each flex circuit 14, 16 has generally nonconductive film layers 72 (the top layer is removed for clarity of illustration) which has been plated by a metallic film 74 where electrical contact is desired.

The template 34 has a slot or suitable opening (not shown) to allow a tail section 116 of the flex circuit 16 to lead out to connect with the various electrically powered or controlled components of the vehicle.

To assemble the buss center 7, the flex circuit 14 is placed on the template 44 with the aid of alignment pins 60. The third template 66 is then placed on top of the aforementioned assembly with the aid of the alignment pins 60. The flex circuit 16 is then placed on the template 66 and aligned with the pins 60. Intermediate terminals 24 are then placed through all necessary holes 46 as determined by the vehicle electrical design. The above subassembly is then placed into the holder 80 with the aid of alignment pins 98 of the holder 80. The top template 34 is then placed on top of the above-mentioned subassembly and locked to the holder 80 with the arrowheads 102. Pluggable diodes, relays and/or other switching or fusing devices are then placed on top of the template 34, depending on the vehicle electrical design. The connector body 42 is then mated with the buss center 7 and held in position by the aid of lower hooks 92.

Figure 5:
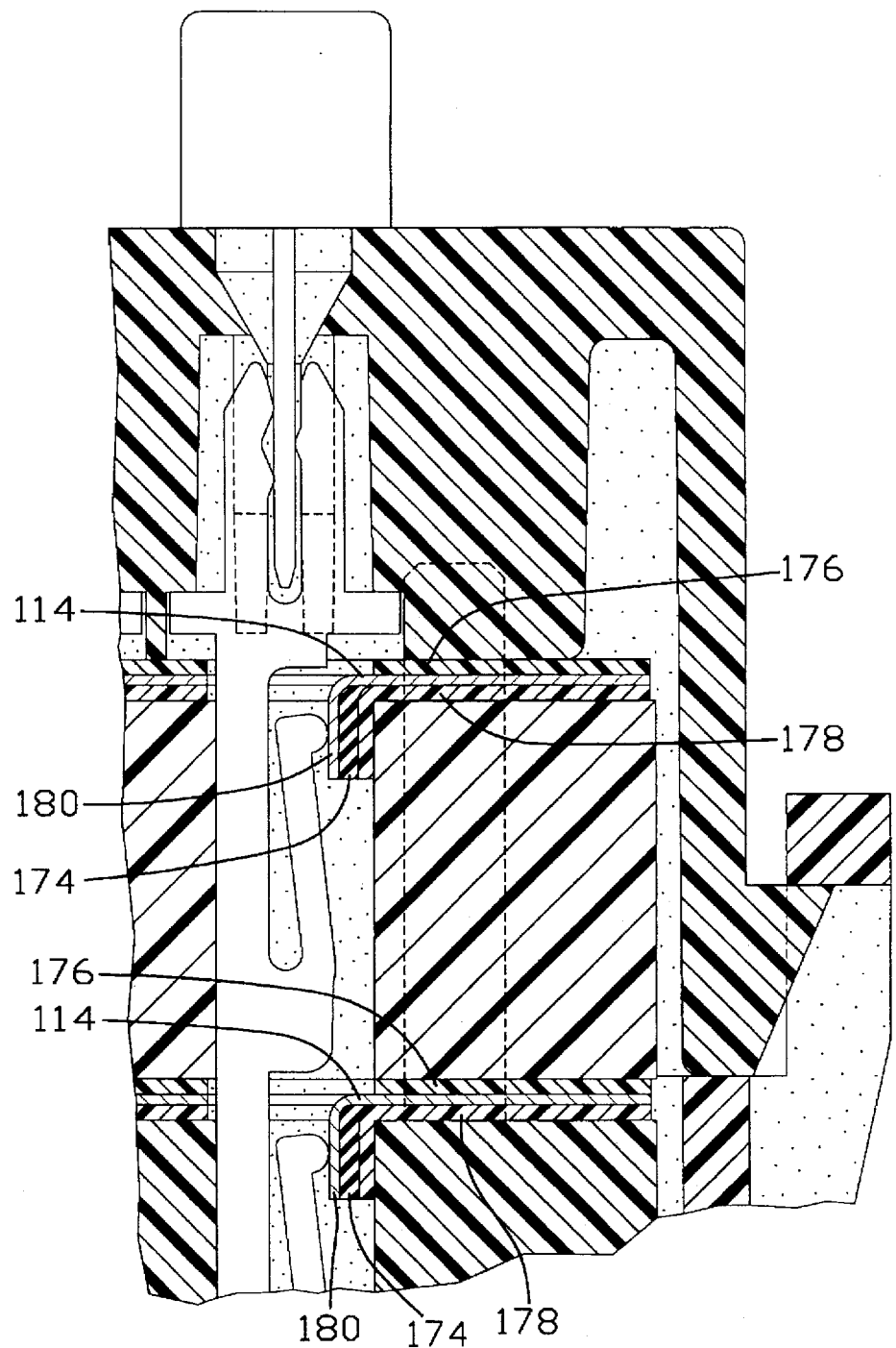
FIG. 5 is a sectional view similar to that of FIG. 3 showing an alternate preferred embodiment of the present invention with an optional elastomeric pad to provide additional normal force between an intermediate terminal and a flag of a flex circuit.

Referring to FIG. 5, an alternate preferred embodiment of the present invention is shown having a flex circuit 114 which has a top insulating layer 176. Between the bottom insulating layer 178 and a metallic surface 180 there is an elastomeric portion 174 which increases the normal force between metallic portion 180 and the flex arm 28 of the terminal 24.

To mount the buss center 7 to the instrument panel substructure 10, there is a frame 80. The frame 80 has at its rearward corners pivot arms and studs 82 and 84 to allow the buss center to pivot from its rear end to lower down for access to the fuses 40. The fuses 40 are held in position by their connection with the intermediate terminal first end. At a front end 86 of the frame, there is a clasp member 88 allowing for a snap-fit connection to a descending cylinder 90 (best shown in FIG. 1) of the magnesium frame 10. A thumb tab 150 is provided to manipulate the clasp 88.

Descending downwardly from the frame 80 is a series of lower hooks 92 which are provided to hold the housing 42 of the female connectors 20. The frame 80 also has an inner ledge 94 which supports the first 44 and third 66 templates and also has guide posts 98 to align within the grooves 54 and 56 of the first template 44. The frame 80 also has four vertical eyes 100 to allow for capture of snap-fit arrowheads 102 provided on the second top template 34. Should disassembly ever be required, the reversal of the assembly process may be easily effectuated.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A modular buss center for an automotive vehicle comprising:

a first plug connector;

an intermediate terminal having a first male end and a second female end and at least one arm, the first end being electrically connected to the first plug connector;

a first template with a hole for receipt of the intermediate terminal;

at least one flex circuit, the flex circuit having at least one cut-out flag, the flag making contact with the intermediate terminal arm;

a second template separated from the first template by the flex circuit, the second template having a hole for receipt of the intermediate terminal second end; and an electrical component positioned on the second template opposite the flex circuit, the electrical component being electrically connected to the intermediate terminal second end.

2. A buss center as described in claim 1 wherein the female second end of the intermediate terminal has three point contact with a male end of the electrical component.

3. A buss center as described in claim 1 wherein the electrical component is physically retained to the second template by the electrical connection between the electrical component and the intermediate terminal.

4. A buss center as described in claim 1 further including a frame holder retaining the plug connector, the intermediate terminal, the first and second templates, the flex circuit and the electrical component.

5. A buss center as described in claim 4 wherein the frame holder has a stud to allow the frame to be pivotally mounted to an automotive vehicle.

6. A buss center as described in claim 5 wherein the frame holder further includes a snap connector to allow for snap connecting of the frame holder to an automotive vehicle.

7. A buss center as described in claim 1 further including a third template and a second flex circuit juxtaposed between the first flex circuit and the second template.

8. A buss center as described in claim 1 wherein the flag makes contact with the arm within the hole of the template at a level below a top surface of the template.

9. A buss center as described in claim 1 having an elastomer pad on the flag opposite the intermediate terminal arm to increase a normal force between the cut-out flag and the intermediate terminal arm.

10. A buss center as described in claim 1 wherein the flex circuit is located by a stud projecting from one of the templates.

11. A modular buss center for an automotive vehicle comprising:

a first female terminal;

an intermediate terminal having a first male end electrically connected to the first female terminal and a second female end, the intermediate terminal having additionally at least one arm;

a first template with a hole for receipt of the intermediate terminal;

a flex circuit having at least one cut-out flag, the flag making contact with the intermediate plug arm within the hole of the template at a level below a top surface of the first template;

a second template separated from the first template by the flex circuit, the second template having a hole for receipt of the intermediate terminal second end;

an electrical component having a male plug positioned on the second template opposite the flex circuit, the electrical component being electrically connected to the intermediate terminal second end; and a frame holding the female terminal and the intermediate terminal first and second templates, allowing the buss center to be connected to the vehicle.

12. A buss center as described in claim 6 wherein the frame has a snap-fit type connection with the second template.

* * * * *